United States Patent
Bonnefoy et al.

(12) 
(10) Patent No.: US 6,211,664 B1
(45) Date of Patent: Apr. 3, 2001

(54) DEVICE FOR MEASURING THE RISE TIME OF SIGNALS INTERFERED WITH BY NOISE FROM GAMMA OR X RADIATION DETECTORS

(75) Inventors: Jean-Paul Bonnefoy, Grenoble; Olivier Monnet, Tullins; Jean-Pierre Rostaing, Vinay, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/152,521

(22) Filed: Sep. 14, 1998

(30) Foreign Application Priority Data

Oct. 1, 1997 (FR) .................................. 97 12214

(51) Int. Cl.[7] .......................... G01R 19/00; G01R 1/00; G01J 1/20; G04F 10/00; H03F 1/26
(52) U.S. Cl. .................. 324/102; 324/76.11; 324/111; 250/370.01; 250/370.13; 368/113; 702/190; 702/193
(58) Field of Search ................ 324/600, 76.11, 324/102, 111; 702/191, 192, 193, 189, 190; 250/370.01; 361/111; 327/37; 368/113, 118

(56) References Cited

U.S. PATENT DOCUMENTS

4,322,641 * 3/1982 Packard ................ 327/311
5,376,798 * 12/1994 Pettit ................... 250/370.14
5,784,241 * 7/1998 Munch et al. .......... 361/111
5,854,489 * 12/1998 Verger et al. .......... 250/370.06

FOREIGN PATENT DOCUMENTS

0 762 145   3/1997 (EP) .
2 738 919   3/1997 (FR) .

OTHER PUBLICATIONS

European Patent Office, Patent Abstracts of Japan, Publication No. 05080156, Publication Date Apr. 2, 1993.

* cited by examiner

*Primary Examiner*—Safet Metjahic
*Assistant Examiner*—Anjan Deb
(74) *Attorney, Agent, or Firm*—Burns, Doane, Swecker & Mathis, LLP

(57) ABSTRACT

The invention relates to a device for measuring the rise time of the electronic component of a signal disturbed by electronic noise and whose signal-to-noise ratio is mediocre. It incorporates a differentiating circuit (C12, C11) having at least one resistor (r) and one capacitor (c) implementing a high pass filter for filtering the low frequency background noise of the signal from the detector and a discriminating circuit (C21, C22) incorporating a comparator (k) for performing a comparison with the filtered signal from the differentiating circuit and an offset voltage selected as a function of the noise level interfering with the signal from the detector.

3 Claims, 3 Drawing Sheets

DEVICE FOR MEASURING THE RISE TIME OF SIGNALS INTERFERED WITH BY NOISE FROM GAMMA OR X RADIATION DETECTORS

FIELD OF THE INVENTION

The invention relates to a device for measuring the rise-time of signals, which have been disturbed or interfered with by noise, coming from semiconductor detectors used for γ or X radiation.

The invention has applications in the field of single photon spectrometry, namely γ or X radiation spectrometry, when the flux of X radiation is sufficiently low to permit a single photon detection. In particular, the device according to the invention can be integrated into the spectrometric measurement correction device described in French patent application FR-A-2 738 919.

PRIOR ART

Various types of detectors for the detection of or X radiation having a low flux are known to the expert. In particular, detectors based on semiconductors (CdTe or CdZn Te) are well known in the art.

Although said detectors are particularly intended for the detection of γ photons, they also permit the detection of X-rays, in the case where there is a low flux of the latter. Throughout the remainder of the description, only the case of γ radiation will be described, but it is obvious that this can also cover low flux X-radiation.

CdTe or CdZnTe semiconductor detectors have the advantage of directly performing the energy conversion of the γ radiation in the semiconductor material, without involving intermediate stages, such as the emission of visible photons in the case of scintillators. This obviates synonymous efficiency loss coupling problems. The energy necessary for creating an electron-hole pair in a semiconductor is much lower than in a gas or in a scintillator (approximately 4 eV in semiconductors, as opposed to 30 eV in gases and 300 eV in photomultiplier scintillator systems). Thus, the number of free charges created by the detected photon is greater, which makes it possible to obtain better energy resolutions. Moreover, the high density and atomic number of semiconductor materials make it possible to use much smaller detection volumes than those of gas detectors or scintillators, whilst maintaining the same quantum detection efficiency.

The use of these semiconductor materials as X or γ radiation detectors involves the deposition of two electric contacts on the surface of the material, at whose terminals a bias voltage is applied. The charge carriers, i.e. the electron-hole pairs created by the interaction of the γ photon with the material, separate under the action of the electric field, the electrons migrating towards the positive electrode and the holes towards the negative electrode. The capacity of these charge carriers to migrate towards electrodes without being trapped by defects present in the semiconductor material conditions the energy resolution of the measured spectrum. This capacity, also known as the charge carrier transport property, is measured by the mobility and the life of the electrons and holes.

When the product mobility x life is comparable or lower than the migration time of the charge carriers to the electrodes, the energy resolution is mediocre.

Numerous methods have been conceived for limiting the trapping of holes, based either on an electric field effect, or on a geometrical effect, or on an amplitude-rise time correlation measurement, the detected signal then being the sum of the charge of the hole and that of the electron.

French patent application FR-A-2 738 919 describes a process for the exploitation of the signal supplied by a semiconductor detector, which makes it possible to obviate the poor transport properties of the holes, producing a signal representative of the rise time of the electronic component of the signal supplied by the detector, i.e. the component of the total signal corresponding to the collection of electrons resulting from the interaction of each γ photon with the semiconductor material.

This document also describes a device for implementing this exploitation of signals. Said device has various means for treating in analog manner signals from the detector, including a peak detector, to whose output is connected a rise discriminator to the peak of the signal. This discriminator is implemented by means of a transistor, which charges a capacitor to the peak level of the signal. The output of said discriminator is connected to means for determining the end of rise time.

In said device, a high pass filter, positioned upstream of the peak detector, ensures the transmission of the input signal. Thus, said high pass filter must have a cutoff frequency fc lower than ½π t, in which t is the maximum rise time of the electronic component of the signal.

For a good efficiency of the electronic correction, it is necessary to measure rise times 3 to 10 times lower than the maximum rise time.

The measurement of the rise time with a peak detector is very sensitive to interference signals, which is not disadvantageous when there is a good signal-to-noise ratio, but which can be disturbing in the frequent case where said S/N ratio is mediocre, i.e. when the signals to be measured are disturbed by the electronic noise.

French patent application FR-A-2 738 693 describes a device for processing information resulting from the interaction of a γ particle with a CdTe detector, which comprises an amplitude circuit making it possible to determine the start time of the measurement of the rise time of a pulse and a timing circuit making it possible to detect the end of the rise time of the pulse. However, said device is only effective in the case where the input signal rises relatively slowly and is subject to very little interference.

However, in practice, signals recovered at the output of detectors are very weak (approximately $10^{-15}$ to $10^{-19}$ coulomb) and the background noise is of the same order of magnitude or higher (said noise being reducible by filtering).

DESCRIPTION OF THE INVENTION

The object of the invention is to obviate the disadvantages of the devices described hereinbefore, by proposing a device making it possible to measure more precisely than the prior art devices, the rise time of signals disturbed by electronic noise, whose signal-to-noise ratio is mediocre.

The device according to the invention makes it possible to obtain freedom from background noise as a result of a frequency filtering, followed by an adapted time filtering, i.e. a filtering in which the gain of the amplifier cascade is adapted to the time characteristics of the signal to be measured and which indicates the duration of the rise time of the signal to be measured.

More specifically, the invention relates to a device for measuring the rise time of the electronic component of a signal disturbed by electronic noise, obtained at the output of a semiconductor detector, in response to the interaction of a photon with the semiconductor material of the detector, characterized in that it comprises:

a differentiating circuit having in combination at least one resistor and one capacitor for implementing a high pass filter for filtering the low frequency background noise from the signal obtained from the detector and a discriminating circuit incorporating a comparator for performing a comparison between the filtered signal from the differentiating circuit and an offset voltage chosen as a function of the noise level interfering with the signal from the detector.

According to an embodiment of the invention, the discriminating circuit comprises an offset voltage source connected to the negative terminal of the comparator, the positive terminal of said comparator receiving the signal obtained at the output of the differentiating circuit.

According to another embodiment of the invention:

the discriminating circuit incorporates a reference voltage source connected in series to a damping resistor, which is itself connected to the negative terminal of the comparator, the differentiating circuit resulting from the connection, to the negative terminal of the comparator, of the output of a low pass RC circuit and the connection, to the positive terminal of the comparator, of the signal obtained directly from the detector.

DETAILED DESCRIPTION OF EMBODIMENTS OF THE INVENTION

The device for measuring the rise time of the electronic component of a signal from a semiconductor detector, according to the invention, comprises means for carrying out a frequency filtering of said electronic component and means for carrying out an adapted time filtering of said electronic component.

The frequency filtering means are constituted by a differentiating circuit, respectively C11 and C12 in FIGS. 1A, 1B, 3A and 3B. The adapted time filtering means are constituted by a discriminating circuit, respectively C21 and C22 in FIGS. 1A, 1B, 3A and 3B. The rise discrimination is implemented by comparing the time variation of the voltage with a fixed voltage, known as the threshold voltage, determined on the basis of the variation gradient of the voltage to be measured and the voltage of the interfering or background noise. Without incident radiation on the polarized detector, the threshold voltage is adjusted so as to only obtain an "acceptable" minimum of interference signal.

The differentiating circuit (C11 or C12) ensures the filtering of the low frequency interference signals from the signal coming from the detector. For this purpose, it incorporates at least one resistor r and one capacitor c implementing a high pass filter.

This high pass filter permits an attenuation of the background noise to the cutoff frequency:

$$f_c = \frac{1}{2\pi\tau}$$

where $\tau$ is time lag (more precisely described hereinafter) lower than the minimum rise time of the signal. The attenuation of the low frequency background noise is performed to the frequency $$\frac{1}{2\pi\tau}.$$

In the prior art implementation of FR-A-2 738 919, the attenuation of the low frequency noise is to $$\frac{1}{2\pi t_{max}}.$$

Thus, $t_{max} > t_{min} > \tau$; the attenuation of the low frequency interference noise of the device according to the invention is greater than that implemented by the prior art device.

Figure 1A:
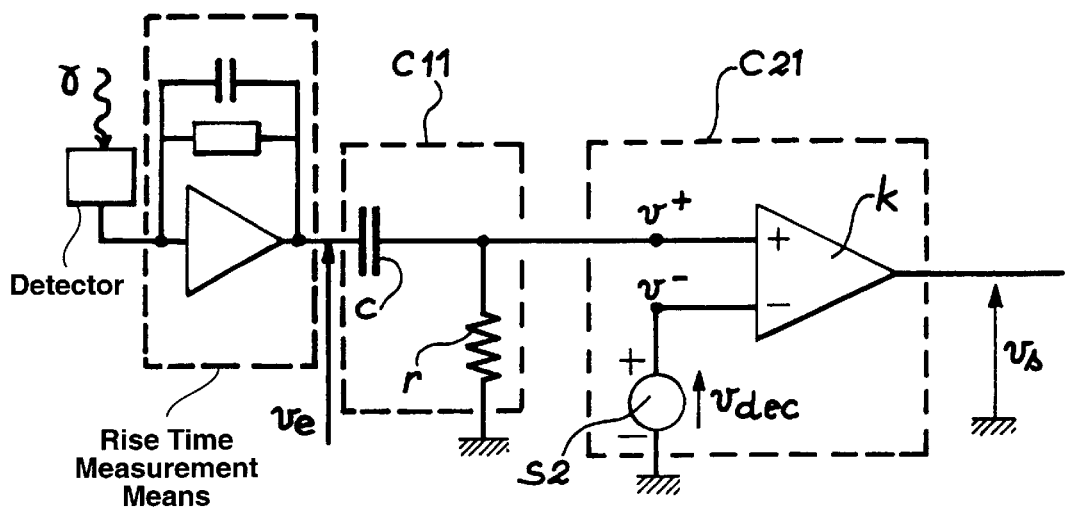
FIGS. 1A and 1B diagrammatically show two variants of the wiring diagram of the rise time measuring device according to the first embodiment.
Figure 1B:
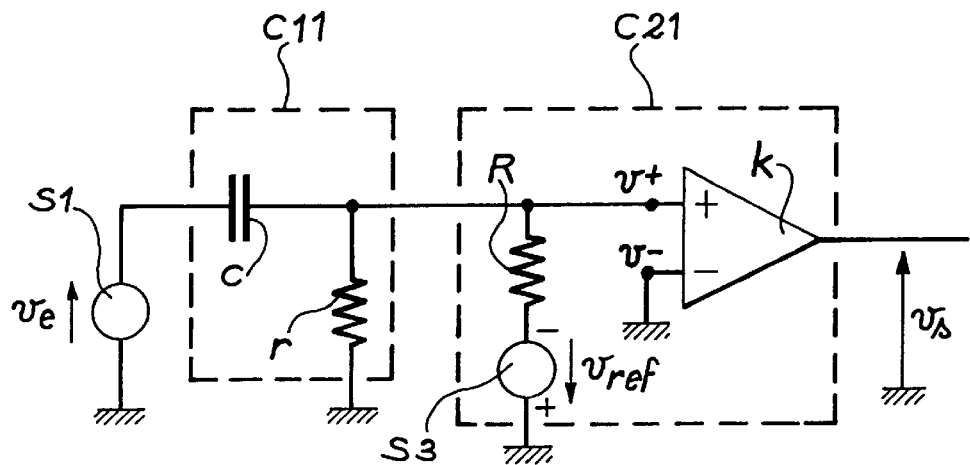

FIGS. 1A and 1B show an order 1 differentiating circuit, i.e. it only has a single r/c circuit. However, in the case of FIGS. 3A and 3B, said circuit can be implemented by several r/c stages or a delay line (more generally referred to as delay networks).

The discriminating circuit (C21 or C22) makes it possible to compare an input signal with said same signal displaced in time (by a time $\tau$)

FIG. 1A shows a first embodiment of the device according to the invention. In this embodiment, the discriminating circuit C21 incorporates a comparator k receiving at the input, on its positive terminal, the signal obtained at the output of the differentiating circuit C11 and, on its negative terminal, a positive offset voltage $V_{dec}$.

The differentiating circuit C11 comprises a resistor r and a capacitor c wired in low pass filter form on the positive terminal of the comparator k of the discriminating circuit. The input signal $v_e$ from the detector, but symbolized in the drawing by the source S1, is filtered by the r/c filter. Thus, only the time variation of the input voltage $v_e$ (which is the derivative of the input signal on time $\tau$ and whose low frequency noise has been eliminated) is introduced, for comparison, into the discriminating circuit.

The differentiating circuit is adapted on the one hand so as not to bring about measurements on the interference signal in the absence of radiation and on the other to the time evolution of the wanted signal and to the rejection of the unwanted signal during the measurement of the rise time.

The output $v_s$ of the comparator k indicates the rise time of the electronic component of the signal from the detector.

The offset voltage $v_{dec}$, produced by the voltage source S2, is adapted to the amplitude of the background noise of the signal to be processed. In other words, it is chosen in such a way that the noise alone does not trigger the comparator k. More specifically, the higher the unwanted noise, the higher is chosen the offset voltage emitted by the source S2.

Said offset voltage $v_{dec}$ is compared with the derivative of the input voltage $$\left(\frac{dv_e}{dt}\right)$$

of the device delayed by a time τ (also called lag τ).

In the applications of the invention, said lag τ is equivalent to approximately 1/10 of the maximum rise time of the electrons. For a detection of a γ photon of energy 150 kev, the electron migration time in the detector is between 1 μs and 0.2 μs. On the output $v_s$, the difference tf−td measures said migration time (cf. FIG. 4).

In other words, the lag $τ_d$ and $τ_f$ produced by said differentiating circuit on td and tf are comparable and of the order of r×c. As a first approximation, rf compensates rd.

FIG. 1B shows a variation of the circuit of FIG. 1A, according to which the positive terminal of the comparator k receives a negative voltage $V_{ref}$. A resistor R is then added between the positive terminal of the comparator k and the voltage source $V_{ref}$.

Figure 2:
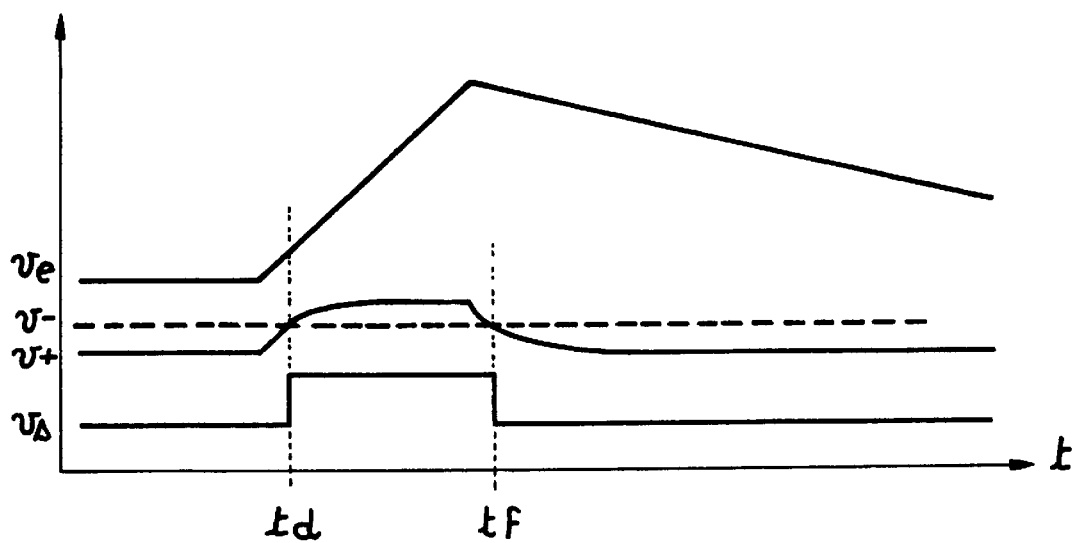
FIG. 2 shows the timing diagram of the signals obtained for the device of FIG. 1.

FIG. 2 shows the time evolution of the signals obtained in the device of FIG. 1. More specifically, said timing diagram shows the input voltage $v_e$ of the device, the voltages $v^+$ and $v^-$ at the positive and negative terminals of the comparator and the output voltage $v_s$ of the device:

the voltage $v_e$ corresponds to the electronic component of the signal from the detector, the voltage $v^-$ is the voltage $v_{dec}$ emitted by the source S2, the voltage $v^+$ is the voltage obtained at the output of the filter implemented by r/c and the voltage $v_s$ corresponds to the signal obtained after comparing the signal $v^+$ with the signal $v^-$, said signal $v_s$ having, at time td, a rise front corresponding to the rise time start and, at time tf, a fall front corresponding to the rise time end of the signal $v_e$.

Figure 3B:
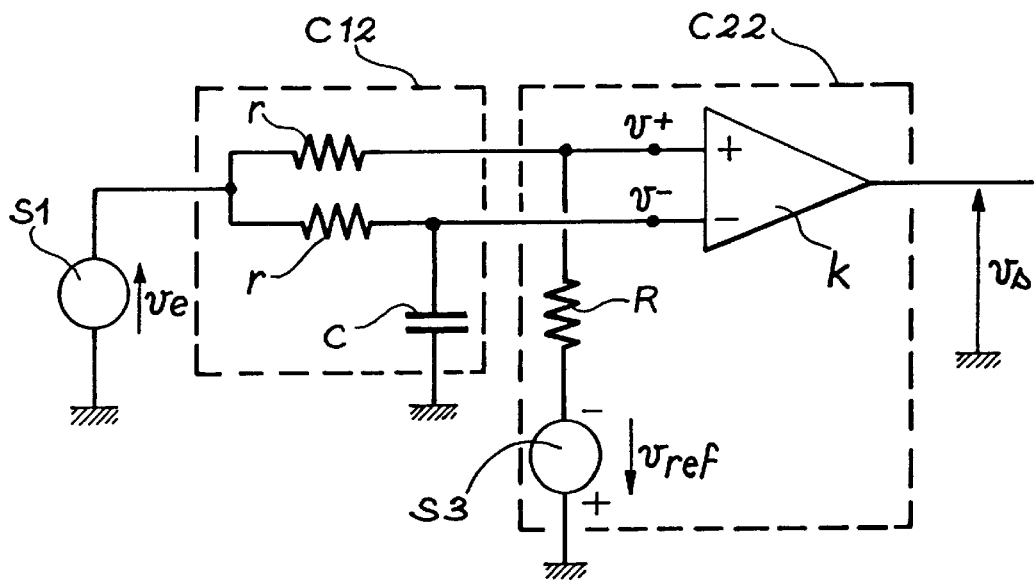
FIGS. 3A and 3B diagrammatically show two variants of the wiring diagram of the rise time measuring device according to the second embodiment.
Figure 3A:
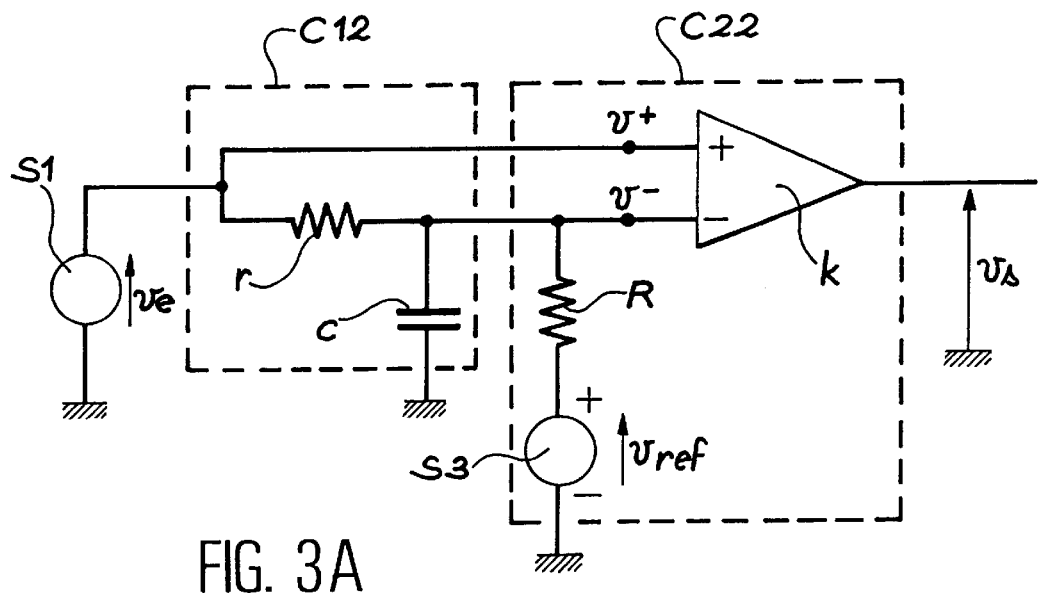

FIG. 3A shows a second embodiment of the device according to the invention, in which the discriminating circuit C22 comprises a comparator k, whose positive terminal receives the input signal $v_e(t)$ and the negative terminal a signal designated v and which is equivalent to:

$$v^- = v_e(t-τ) + v_{dec}.$$

More specifically, the negative terminal of the comparator k receives on the one hand the reference voltage $v_{ref}$ from the voltage source S3 and damped by the damping resistor R and, on the other hand, the voltage obtained on one of the two outputs of the differentiating circuit C12, i.e. the input signal $v_e(t-τ)$ delayed by τ compared with the input signal $v_e(t)$.

In this embodiment, the offset voltage is regulated by means of the reference voltage $v_{ref}$ with $$v_{ref} = \frac{R+r}{r} \cdot v_{dec}$$

with R>>r.

The differentiating circuit C12 incorporates a resistor r and a capacitor c wired as a low pass filter on the negative terminal of the comparator. In practice, one of the outputs of the differentiating circuit C12 is connected to the output of the damping resistor R, whilst the other output is connected to the positive terminal of the discriminator.

In this second embodiment, the influence of the background noise is reduced by decreasing the lag τ.

FIG. 3B shows a variant of the circuit of FIG. 3A, according to which the voltage $v_{ref}$ is negative and introduced onto the positive terminal of the comparator k. A resistor r is then add ed between the voltage source $V_e$ and said positive terminal.

In the two embodiments according to the invention (FIGS. 1A/B and FIGS. 3A/B), the voltage observed by the comparator k is the voltage at the terminals of the resistor r. In the first embodiment, said voltage is observed directly, whereas in the second embodiment it is observed in series opposition by the comparator.

In both embodiments, the differentiating circuit has been implemented by means of a single tc stage. However, in the second embodiment illustrated by FIG. 3, it can be implemented by means of two or more r/c stages or by means of a delay line characterized by its lag.

Figure 4:
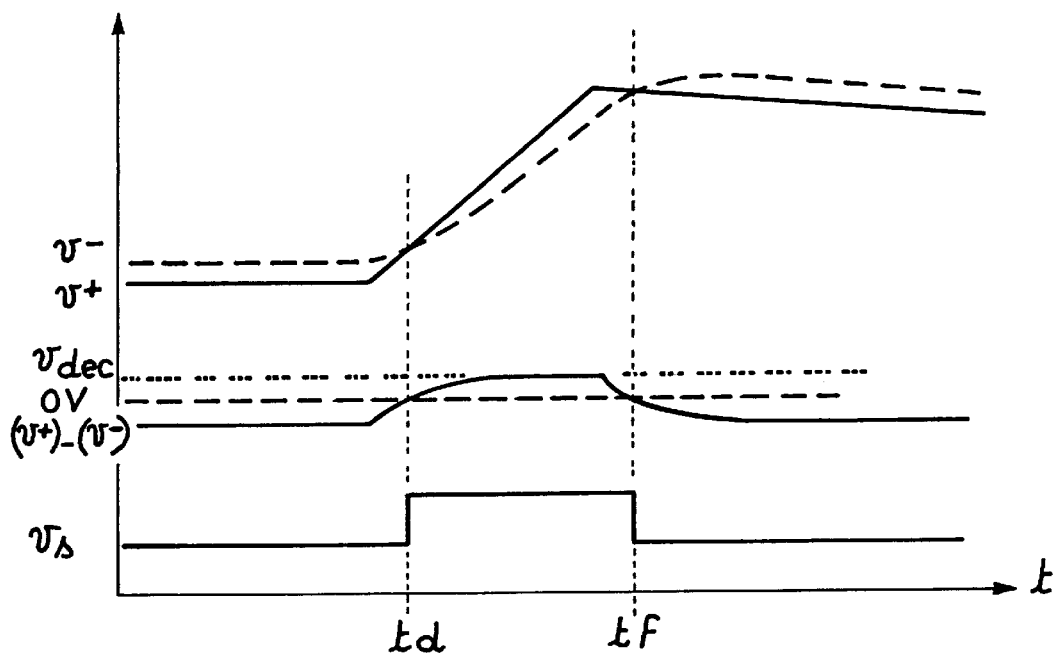
FIG. 4 shows the timing diagram of the signals obtained for the device of FIG. 3.

FIG. 4 shows the time evolution of the different voltages flowing through this device. More specifically, are shown:

the voltage $v^+$ at the positive terminal of the comparator k: $v^+ = v_e(t)$;

the voltage $v^-$ at the negative terminal of the comparator k: $v^- = v_e(t-τ) + v_{dec}$;

the voltage $v_{dec}$ expresses the offset of the voltage between $v^+$ and $v^-$, ($v^+ - v^-$), observed in the absence of an input signal;

the voltage $(v^+) - (v^-)$ and the voltage $v_s$ obtained at the output of the comparator k, said signal $v_s$ having a rising front and a falling front corresponding respectively to the rise start and end times of the electronic component of the signal from the detector.

What is claimed is:

1. Device for measuring the rise time of the electronic component of a signal disturbed by electronic noise, obtained at the output of a semiconductor detector, in response to the interaction of a photon with the semiconductor material of the detector, characterized in that it comprises:

a differentiating circuit (C11, C12) having in combination at least one resistor (r) and one capacitor (c) for implementing a high pass filter for filtering the low frequency background noise from the signal obtained from the detector and a discriminating circuit (C21, C22) incorporating a comparator (k) for performing a comparison between the filtered signal from the differentiating circuit and an offset voltage chosen as a function of the noise level interfering with the signal from the detector wherein the output of the comparator (k) comprises a voltage signal Vs exhibiting a rising front and a falling front corresponding, respectively, to rise start and end times of an electronic component of the signal from said detector, the voltage signal Vs thereby providing an indication of the migration time of electrons in said detector.

2. Device according to claim 1, characterized in that the discriminating circuit (C21) incorporates an offset voltage source (S2), connected to the negative terminal of the comparator, the positive terminal of said comparator receiving the signal obtained at the output of the differentiating circuit (C11).

3. Device according to claim 1, characterized in that:

the discriminating circuit (C22) incorporates a reference voltage source (S3) connected in series to a damping resistor (R), which is itself connected to the negative terminal of the comparator, the differentiating circuit (C12) is connected to the inputs of the discriminating circuit (C22), the positive terminal of the comparator directly receives the signal from the detector and the negative terminal from the comparator receives a signal delayed by a delay network (lag τ).

* * * * *